United States Patent [19]

Quick

[11] 4,129,339
[45] Dec. 12, 1978

[54] TRASH REMOVAL APPARATUS FOR SUGAR CANE HARVESTERS

[75] Inventor: Donald J. Quick, Bundaberg, Australia

[73] Assignee: Massey-Ferguson Services N.V., Curacao, Netherlands Antilles

[21] Appl. No.: 780,746

[22] Filed: Mar. 24, 1977

[30] Foreign Application Priority Data

Mar. 30, 1976 [GB] United Kingdom ............... 12819/76

[51] Int. Cl.² ............................................. B65G 53/14
[52] U.S. Cl. ...................................... 302/21; 209/138; 302/34
[58] Field of Search ........................ 302/11, 21, 30, 34, 302/46, 59, 60, 61.8, 37, 64, 2 R; 209/3, 133, 136, 137, 138, 139 R, 250, 477, 502; 74/242.1 R, 242.1 A, 242.1 TA, 242.1 FP, 242.15 R

[56] References Cited

U.S. PATENT DOCUMENTS

| 2,696,741 | 12/1954 | Wilkin | 74/242.1 R |
| 2,763,516 | 9/1956 | Brooke et al. | 302/64 |
| 3,226,853 | 1/1966 | Kamlukin | 74/242.15 R X |
| 3,251,631 | 5/1966 | Hennen | 302/34 |
| 3,788,048 | 1/1974 | Stiff et al. | 209/250 X |
| 3,925,199 | 12/1975 | Quick | 209/139 R X |

FOREIGN PATENT DOCUMENTS 2144688   3/1973   Fed. Rep. of Germany ... 74/242.1 FP X Primary Examiner—Bruce H. Stoner, Jr.
Assistant Examiner—James L. Rowland

[57] ABSTRACT

Trash removal apparatus in a sugar cane harvester comprises an axial flow extractor fan to draw trash out of harvested cane and to discharge it through a duct on the pressure side of the fan. The duct is in the form of a helical trash guide member which collects the trash out of the air flow and discharges the trash laterally. The trash guide member is mounted for pivotal movement about the duct axis and a mechanism is provided for turning it to discharge trash in a desired direction.

13 Claims, 4 Drawing Figures

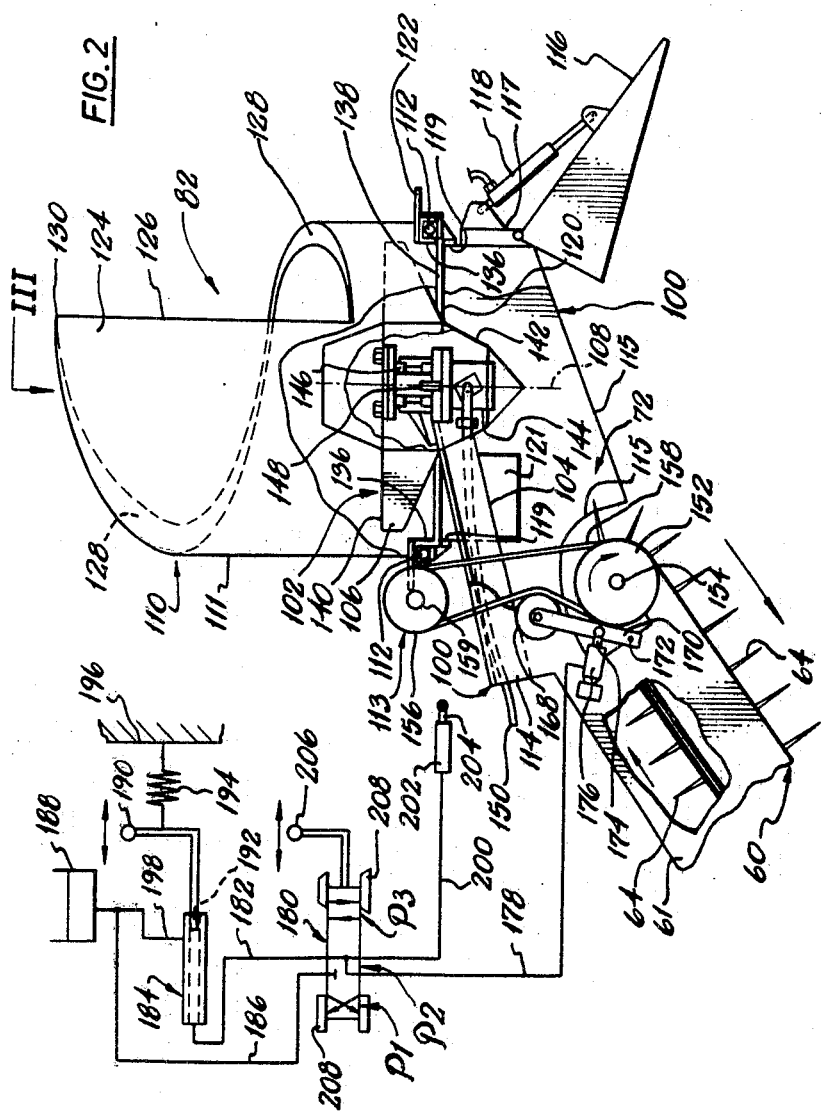

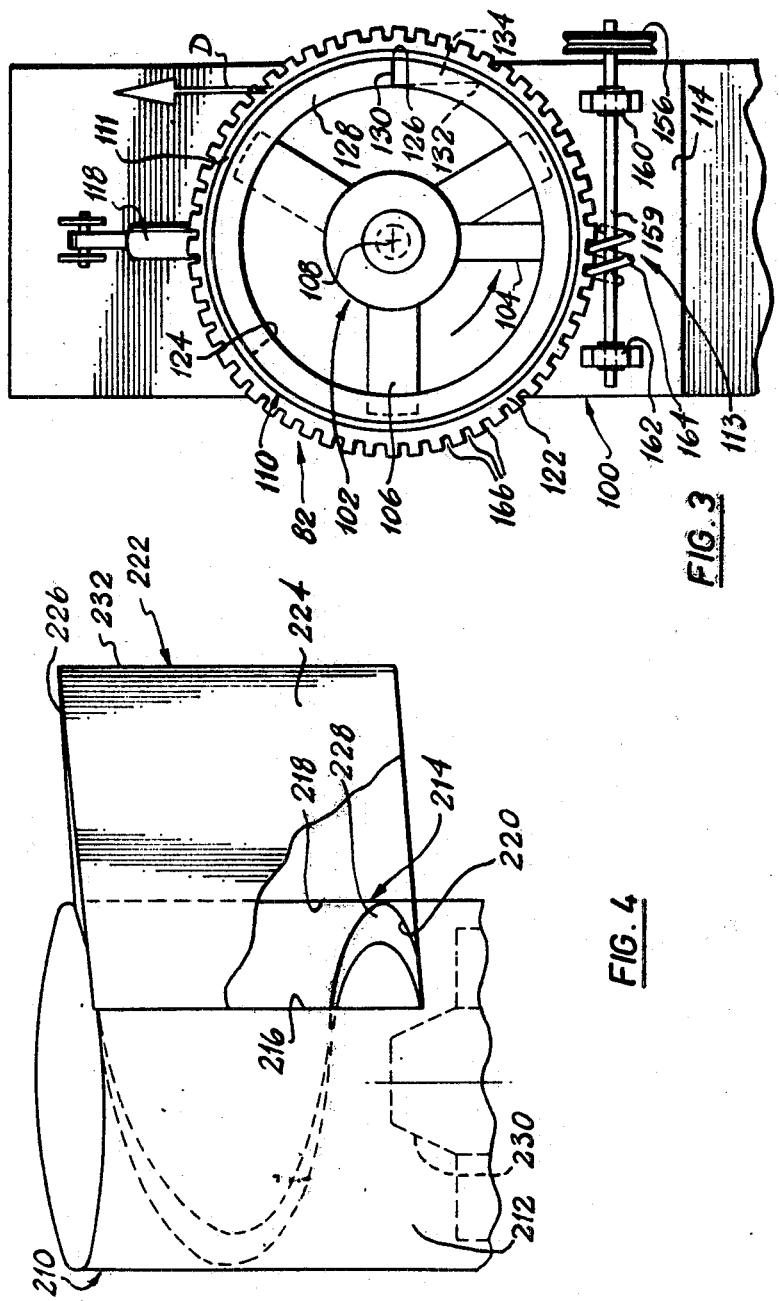

TRASH REMOVAL APPARATUS FOR SUGAR CANE HARVESTERS

This invention relates to trash removal apparatus for harvesters of sugar cane or similar crops such as bamboo.

In sugar cane harvesters it is common practice to provide a fan which passes air at a high rate of flow through the harvested cane. The air entrains cane leaves and other trash and the air and entrained trash is discharged from the harvester.

A problem which arises in such a sugar cane harvester is that, depending on wind direction during harvesting, some of the discharged trash may fall into the cane bins or trailers or other transport vehicles which are moved along with the harvester during harvesting to receive the crop. This is undesirable because the trash lowers the overall quality of the harvested crop and the farmer is paid less for it by the sugar mill.

It is an object of the present invention to provide trash removal apparatus in which this problem is mitigated or overcome.

According to the present invention there is provided trash removal apparatus for harvesters of sugar cane or similar crops comprising:
 a support structure; and
 an axial flow fan mounted on said support structure the fan having fan blades rotatable about a fan axis; characterized by
 a helical trash guide member located on the pressure side of said axial flow fan said helical trash guide member comprising a smoothly curved wall leading to a trash discharge edge, said wall extending round the fan axis, and a helical flange carried by said smoothly curved wall and projecting inwardly therefrom; and by
 said helical trash guide member being mounted on said support structure for pivotal movement about a pivot axis close to or coaxial with the fan axis; and by
 thrust means connected to said helical trash guide member and capable of effecting pivotal movement about said pivot axis.

The provision of a pivotally mounted helical trash guide member together with thrust means to pivot it enables the operator of a sugar cane harvester to control the direction of trash discharge according to wind conditions and the direction of travel of the harvester during harvesting.

An embodiment of the invention will now be described by way of example with reference to the accompanying drawings in which:

FIG. 2 shows in side elevation and on a larger scale, trash removal apparatus seen in FIG. 1, together with a diagram of a hydraulic circuit associated with the apparatus;

FIG. 3 shows a plan view of the trash removal apparatus of FIG. 2 as indicated by arrow III in FIG. 2; and FIG. 4 shows, in a view similar to that of FIG. 2, part of a modified form of trash removal apparatus.

Figure 1:
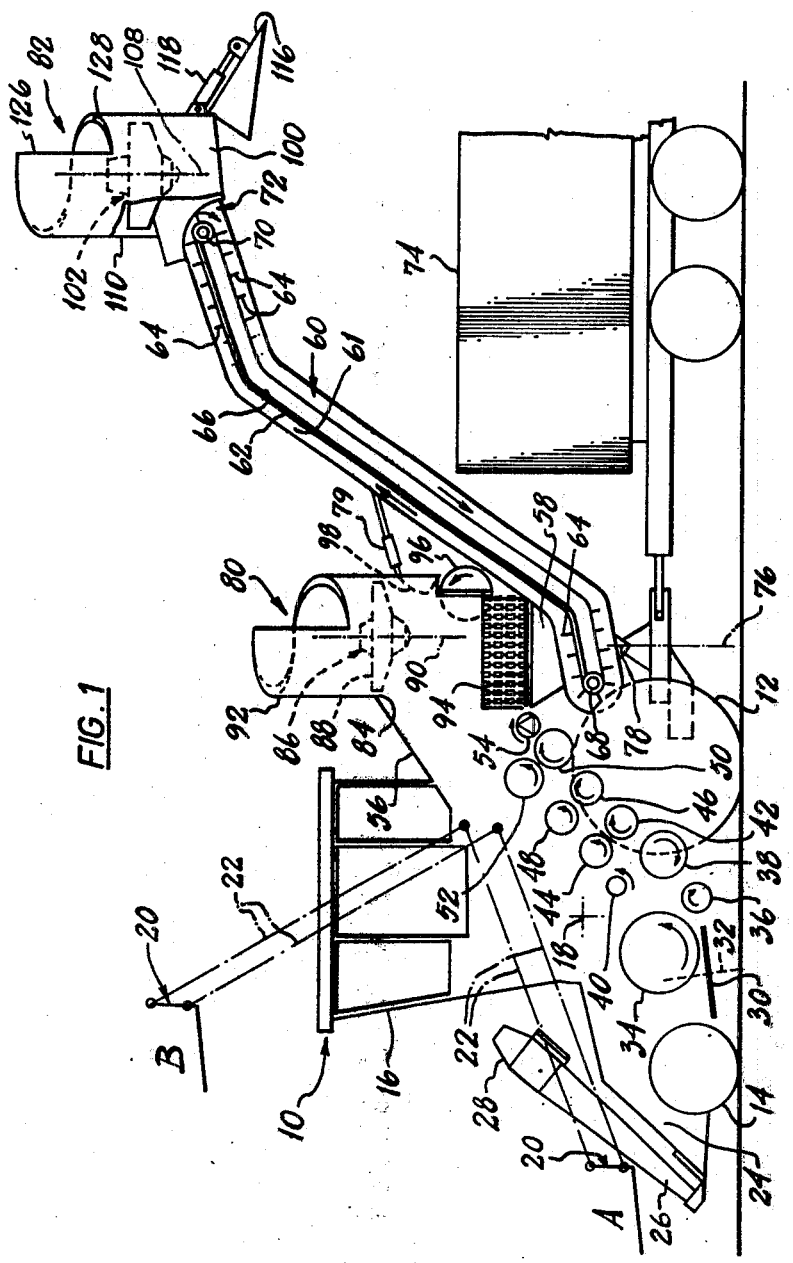
FIG. 1 shows, in side elevation and somewhat diagrammatically, a sugar cane harvester having trash removal apparatus and drawing a cane trailer, the harvester being shown partly cut away to reveal its internal crop handling apparatus.

Referring to FIG. 1, a sugar cane harvester 10 comprises rear traction wheels 12, forward steerable wheels 14, an operator's cab 16, and a diesel engine located at 18.

Cane topping apparatus 20 (shown diagrammatically) for removing the tops from standing canes is mounted on a parellelogram linkage boom 22 and is height adjustable between positions A and B.

Cane gathering means is provided comprising a pair of transversely-spaced upstanding walls 24 defining a rearwardly-converging throat. Each crop gathering wall is surmounted by a rotatable crop lifter 26 having a helical flight (not shown) and driven by a hydraulic motor located in a housing 28 at its upper end.

Base cutting means is provided for severing canes from their roots. The base cutting means comprises twin base cutting discs 30 having projecting blades (not shown), the discs being power-rotatable about respective upwardly extending axes 32.

Stick feeding means for feeding severed cane sticks rearward through the harvester is provided comprising the following power-rotated rollers:
 a large paddle type feed-in roller 34 mounted just above the base-cutting discs 30;
 a paddle type butt lifter roller 36 mounted just behind the base-cutting discs 30; and
 three pairs of feeding and cleaning rollers 38, 40 and 42, 44 and 46, 48.

Cane dividing means for cutting canes into billets of length up to about 30 centimeters is provided in the form of a pair of in-running cane chopper drums 50, 52 each carrying a pair of opposed axially-extending blades (not shown). The drums are driven in timed relationship and the blades on the two drums co-operate in pairs to chop the cane.

A flipper roller 54 is positioned just behind the chopper drums 50, 52 and rotates in the direction indicated to assist in maintaining the cane billets airborne as they pass through a housing 56 defining a trash extraction zone.

A downwardly-tapering hopper 58 mounted on a chain and slat elevator conveyor 60, is positioned below housing 56 to receive the billets. The conveyor comprises a frame supporting a pair of transversely spaced side walls 61 between which are located a pair of transversely spaced chains 62 interconnected by transverse slats 64 and a support plate 66 below the upper run of the conveyor. The chains are trained round end sprockets 68, 70. The slats 64 pass through hopper 58 and collect billets therefrom and deliver them at the upper end 72 of the conveyor from whence they fall into a trailer 74 drawn by the harvester 10.

Elevator conveyor 60 is mounted on the harvester 10 so as to be capable of pivotal movement about a vertical axis 76 and about a horizontal axis 78. Pivotal movement about the vertical axis permits billet discharge at either side (during two-way harvesting) or at the rear (when opening up a field). Pivotal movement about the horizontal axis is limited by a resilient link 79 between the elevator and housing 56 which is provided to absorb the impact when the conveyor collides with a close-coupled trailer when traversing rough terrain.

Two sets of trash removal apparatus 80 and 82 are provided to remove cane leaves and other lightweight matter from the cane billets before their deposition in trailer 74. Apparatus 80 is positioned to remove trash from the billets as they pass through housing 56 into hopper 58, and apparatus 82 is mounted at the upper end 72 of conveyor 60 to remove trash from the billets as they fall towards trailer 74.

Trash removal apparatus 80 is mounted on the upper portion 84 of housing 56, which constitutes a support structure forming part of the trash removal apparatus. Apparatus 80 further comprises a belt-driven axial flow fan 86 mounted on the support structure and having fan blades 88 rotatable about a fan axis 90 to produce an upwardly directed air blast through housing 56.

A helical trash guide member 92 in the form of a duct is located on the pressure side of fan 86 to direct trash in a desired direction. The helical trash guide member is mounted on the support structure 84 for pivotal movement about a pivot axis co-axial with the fan axis 90 and thrust means (not shown) is provided to effect said pivotal movement to control the direction of trash discharge.

Trash removal apparatus 80 is substantially identical with apparatus 82 and the details of its structure will be apparent from the description of apparatus 82 which follows.

Air inlet means for trash removal apparatus 80 comprises a hanging screen 94 and a rotatable screen roller 96. Hanging screen 94 extends in a U-shape along three sides of housing 56 and comprises a series of closely spaced hanging chains weighted at their lower ends by a steel bar. Roller 96 is formed of wire mesh, is rotated in the direction indicated and co-operates with an aerodynamically-shaped lobe 98 at the rear of housing 56.

Trash removal apparatus 82 is mounted on a housing 100 carried on the frame of conveyor 60 at the upper end 72 thereof. Housing 100 constitutes a support structure forming part of the trash removal apparatus. Apparatus 82 further comprises an axial flow fan 102 mounted on housing 100 through a single support arm 104 and having fan blades 106 rotatable about a fan axis 108 to produce an upwardly directed air blast through housing 100.

A helical trash guide member 110 comprising a duct 111 is located on the pressure side of fan 102 to direct trash in a desired direction. The helical trash guide member is mounted through an annular ball-type bearing 112 on the housing 100 for unlimited pivotal movement about a pivot axis co-axial with the fan axis 108. Thrust means 113 connected to trash guide member 110 is provided to effect said pivotal movement to control the direction of trash discharge.

Housing 100 forms a continuation of side walls 61 of conveyor 60 and is positioned above the upper end 72 of the conveyor. The housing is a generally box-shaped structure and has a projecting portion 114 to receive the fan support arm 104 and to which the arm is secured. The lower portion of the housing defined by an edge 115 is entirely open to allow the downward movement of billets from conveyor 60 and the upward movement of air through the flow of billets to fan 102. A billet guide flap 116 is mounted by a pivot on a bracket 117 carried by housing 100 and is angularly adjustable by means of a hydraulic ram 118.

The upper portion of housing 100 is formed with a cylindrical flange 119 defining a circular opening 120 centred on the joint fan and pivot axis 108. Bearing 112 is secured to collar 119. An arcuate transverse plate 121 is mounted in housing 100 as a downward continuation of collar 119 to guide trash through the collar.

The helical trash guide member 110 is mounted on bearing 112 through an annular plate 122. The trash guide member is in the form of a cylindrical duct having a smoothly curved wall 124 leading to a vertical trash discharge edge 126 provided by the duct. Wall 124 extends round the fan axis 108.

A helical flange 128 is welded to the inside surface of wall 124, projects inwardly therefrom and defines the upper edge of the wall. The wall's upper edge is thus also helical in form. The trash discharge edge 126 extends, approximately vertically, from the upper end 130 of flange 128 to a position close to the lower end of the flange. The flange 128 extends, as shown in FIG. 3 to a position identified by reference numeral 132 slightly beyond trash discharge edge 126 at which a tapering end portion 134 of the flange smoothly merges into wall. It will thus be appreciated that the helical trash guide member, comprising flange 128 and duct 111, extends through slightly more than 360° around the fan axis 108.

The lower end of duct 111 is formed into a reduced diameter entry portion 136 corresponding in the diameter with and aligned with collar 119 on housing 100. It is particularly to be noted that the joint 138 between the helical trash guide member 110 and the support structure in the form of housing 100 is located on the suction side of fan 102. By the word "joint", in this context is meant the relatively narrow gap between the confronting edges of collar 119 and entry portion 136 of duct 111. By the term "suction side of the fan" is meant the upstream side (having regard to the direction of air flow past fan 102) of the trailing edges 140 (having regard again to the direction of air flow past fan 102) of the fan blades 106.

Fan 102 comprises a housing 142 carried by support arm 104 and which itself houses and supports a hydraulic motor 144 on which the fan blades 106 are journalled through bearings 146. The fan blades are rotated by the output shaft 148 of motor 144. The hydraulic supply hoses 140 for motor 144, which are connected to a pump (not shown) driven by the cane harvester's diesel engine, extend through support arm 104 so as to avoid the wrapping of trash round them.

Thrust means 113 which is provided to pivot helical trash guide member 110 about axis 108 to a desired position comprises a drive capable of continuously rotating the trash guide member about axis 108. The drive comprises a drive train connected to a power source, and a clutch located in the drive train. The drive train comprises a pulley 152 mounted on and driven by the shaft 154 (constituting said power source) which carries end sprocket 70 (not seen in FIG. 2) of conveyor 60, a pulley 156, and a vee belt 158 interconnecting these pulleys.

Pulley 156 is fixed to a transverse shaft 159 supported by bearings 160, 162 on portion 114 of housing 100. A short worm gear wheel 164 is secured to shaft 159 between the bearings and enters a series of uniformly spaced slots 166 formed in annular plate 122 which thus constitutes a ring gear.

A jockey pulley 168 is journalled at one end of a short lever arm 170 mounted by a pivot 172 at its other end on the adjacent side wall 61 of conveyor 60. The piston 174 of a hydraulic ram 176 is pivotally connected to lever 170 between ends of the lever, and the ram itself is mounted on side wall 61.

Ram 176 constitutes (for the purpose of definition of the invention) a remotely operable thrust device and together with jockey pulley 168 forms part of the clutch in the drive train for rotating helical trash guide member 110.

Ram 176 is in the form of a single acting slave ram and is connected by a hydraulic line 178 to a manually operable control valve 180 and from thence by a hydraulic line 182 to a manually operable single-acting master cylinder 184 and by a hydraulic line 186 to a hydraulic reservoir 188.

Control valve 180 and master cylinder 184 are both located in the cab 16 of the harvester so as to be easily operable by the driver.

Master cylinder 184 has a control handle 190 directly connected to its piston 192, and a tension spring 194 acts between the control handle and an adjacent fixed structure 196 to retract the piston. Spring 194 constitutes resilient means biassing jockey pulley 168 in the direction of decreasing belt tension. A hydraulic line 198 between reservoir 188 and the master cylinder 184 makes good any loss of hydraulic fluid, after retraction of piston 192.

Control valve 180 is connected by a hydraulic line 200 to a second single-acting slave ram 202, similar to ram 176. Ram 202 has a piston 204 connected to a lever arm (not shown) corresponding to lever arm 170 and associated with trash removal apparatus 80. Helical trash guide member 92 of apparatus 80 is pivotally mounted and provided with thrust means (not shown) to rotate it in exactly the same manner as helical trash guide member 110 of trash removal apparatus 82. Cylinder 202 operates to control such rotation in the same manner as cylinder 176.

A control handle 206 is provided on control valve 180 whereby the valve can be manually slid in its sleeve 208 between positions P1, P2 and P3. In position P1 master cylinder 184 is connected to slave ram 176 and slave ram 202 is connected to reservoir 188. In position P2 master cylinder 184 is connected to both slave rams in parallel. In position P3 master cylinder 184 is connected to slave ram 202 and slave ram 176 is connected to reservoir 188.

In use, standing cane sticks have their tops removed by topper 20. Lodged or fallen cane sticks are raised by crop lifters 26 and all cane sticks are severed from their roots by base cutters 30. The cane sticks are fed by rollers 34 to 48 to chopper drums 50, 52 where they are chopped into billets.

The cane billets issuing from chopper drums 50, 52 cascade over flipper roller 54 through housing 56 and fall into hopper 58. As they do so, air is drawn into housing 56 through screen 94 and roller 96 by fan 86. The upwardly-moving air flow passes through the stream of billets proceeding towards hopper 58 and entrains cane leaves and other trash.

The flow of air and entrained trash passes axial flow fan 86 and in so doing, the trash is caused (by virtue of the rapid rotation of the fan blades 88 and the rotational movement which they impart to the trash) to move upwards mainly in a relatively narrow cylindrical zone close to the internal surface of helical trash guide member 92. The helical trash guide member intercepts the trash and discharges it in a chosen direction in a manner to be more fully described below in relation to trash removal apparatus 82.

The billets in hopper 58 are engaged by slats 64 of conveyor 60 and are conveyed upwards and discharged from the upper end 72 of the conveyor through housing 100. Billet guide flap 116 prevents the billets being thrown too far rearwards.

As the billets pass through housing 100, air is drawn into the housing through its open lower end by fan 102. The upwardly-moving air flow passes through the stream of billets and entrains the remaining cane leaves and other trash.

The flow of air and entrained trash passes axial flow fan 102 and in so doing, the trash is caused (by virtue of the rapid rotation of the fan blades 106 and the rotational movement which they impart to the trash) to move upwards mainly in a relatively narrow cylindrical zone close to the internal surface of wall 124.

This zone of upwardly moving trash is intercepted by helical flange 128. The trash is itself moving in a helical path (having both upward and rotational components of movements) and therefore readily follows the direction of movement in which it is guided by the flange. The direction of rotation of fan blades 106 is, as shown in FIG. 3, the direction of rotation needed by the trash in order to follow helical flange 128 upwards.

It will thus be appreciated that the trash becomes concentrated in a helically moving cylindrical band just below flange 128. Accordingly when the trash reaches trash discharge edge 126, it is discharged tangentially with respect to duct 111 and approximately horizontally.

The direction of trash discharge is indicated by arrow D in FIG. 3. In FIG. 3, the trash is shown as being discharged parallel to the longitudinal direction of conveyor 60. If the driver of the harvester sees that trash is falling into trailer 74 or into some other transport vehicle (such as a truck being driven alongside the harvester) he can easily change the direction of trash discharge merely by manually pushing control handle 190 to the left as seen in FIG. 2.

With control valve 180 set in position P2 as shown in FIG. 2, such movement of control handle 190 extends both of the slave rams 176 and 202. In the case of ram 176, this causes its jockey pulley 168 to tension belt 158 whereupon drive is transmitted from shaft 154 through the belt to shaft 159 and worm wheel 164, which rotates the helical trash guide member 110 about axis 108. The result is exactly analogous for ram 202.

When the two trash guide members 92 and 110 have reached a position in which the trash is no longer falling into the transport vehicles, the driver releases control handle 190 and spring 194 retracts piston 192 thereby retracting the pistons of the slave rams 176 and 202 which interrupts the drive to the helical trash guide members.

The drives which rotate the two helical trash guide members 92 and 110 are constructed so that both trash guide members are turned at the same rate and therefore when control valve 180 is in position P2 they move in unison. Such movement in unison may be needed at the end of each row of cane after the harvester has turned round. The trash guide members would then be turned through 180°.

However the helical trash guide members 110 and 92 are controlled individually by master cylinder 184 when control valve 180 is in positions P1 and P3 respectively. It will be noted that in the positions P1 and P3 rams 202 and 176 respectively are connected to reservoir 188 thereby ensuring that their respective drives are disengaged.

The principal advantage of the above-described embodiment lies in its provision of easy control of trash discharge direction by the cane harvester operator to take account of wind conditions. Trash can always be discharged in the optimum or best compromise direction having regard to both the crop and the position of transport vehicles.

FIG. 4 illustrates a further embodiment of the invention. This embodiment has exactly the same structure as the embodiment described above apart from having a modified helical trash guide member 210.

Helical trash guide emmber 210 is in the form of a cylindrical open-ended duct 212.

A large approximately rectangular opening 214 defined by side edges 216, 218 and a bottom edge 220 is cut out of duct 212 from its upper end.

A projecting trash guide member 222 is secured to duct 212 at edge 216 and comprises a vertical flat plate 224, forming a continuation at edge 216 of the smoothly curved wall of the duct. A flange 226 is secured to the upper edge of plate 224 and forms a continuation of a helical flange 228, which is mounted inside duct 212 and corresponds to flange 128 of the preceding embodiment.

Duct 212 is mounted coaxially with respect to a fan 230. It will be seen from this embodiment that the helical trash guide member can be made from a cylindrical duct and need not have the portion of the duct above the helical flange removed. Projecting trash guide member 222 serves to control the direction of trash discharge more precisely, and itself provides a trash discharge edge 232.

Among modifications which could be made in the above described embodiments without taking them outside the scope of the invention are the following, which are listed by way of example:

1. the helical flange (128, 228) need not be exactly helical (e.g. of constant pitch). The basic requirement of it is that it provides a smooth combination of a path around the fan axis and a path along the fan axis;
2. similarly, the helical trash guide members (92, 110, 210) need not have internal trash guide surfaces which are perfectly cylindrical. The basic requirement is smooth curvature, though cylindrical form is to be preferred;
3. the helical trash guide member may extend around the fan axis through less than 360 degrees (e.g. 270°) or more than 360° if desired;
4. the helical trash guide member's pivot axis need not be exactly coincident with the fan axis;
5. the width of the helical flange of the helical trash guide member in the above embodiments is approximately one thirteenth of the diameter of the duct which carries it, but it may be of width from one fifth to one twenty-fifth of said diameter;
6. other forms of drive for turning the helical trash guide member, e.g. a hydraulic motor, could be provided.

What we claim is:

1. Trash removal apparatus for harvesters of sugar cane or similar crops comprising:
   a support structure; and
   an axial flow fan mounted on said support structure the fan having fan blades rotatable about a fan axis; characterized by
   a helical trash guide member located on the pressure side of said axial flow fan said helical trash guide member comprising a smoothly curved wall leading to a trash discharge edge, said wall extending round the fan axis, and a helical flange carried by said smoothly curved wall and projecting inwardly therefrom; and by
   said helical trash guide member being mounted on said support structure for pivotal movement about a pivot axis close to or coaxial with the fan axis; and by
   thrust means connected to said helical trash guide member and capable of effecting pivotal movement about said pivot axis.

2. The trash removal apparatus of claim 1 characterized in that said helical trash guide member comprises a duct providing said smoothly curved wall, and said helical flange extends round the inner surface of the duct and projects inwardly therefrom.

3. The trash removal apparatus of claim 2 characterized in that the joint between said helical trash guide member and said support structure is located on the suction side of the fan.

4. The trash removal apparatus of claim 2 characterized in that said trash discharge edge is provided by the duct.

5. The trash removal apparatus of claim 2 characterized by a projecting trash guide member secured to the duct and forming a continuation of said smoothly curved wall, the projecting trash guide member itself providing said trash discharge edge.

6. The trash removal apparatus of claim 4 characterized by a flange carried by said projecting trash guide member and forming a continuation of said helical flange.

7. The trash removal apparatus of claim 1 characterized in that said helical trash guide member extends through more than 270° around the fan axis.

8. The trash removal apparatus of claim 1 characterized by a bearing supporting said helical trash guide member on said support structure for continuous rotation about said pivot axis.

9. The trash removal apparatus of claim 8 characterized in that said thrust means comprises a drive capable of rotating said helical trash guide member.

10. The trash removal apparatus of claim 9 characterized in that said drive comprises a slotted ring mounted on the helical trash guide member and co-axial with said pivot axis, and a complementary worm wheel.

11. The trash removal apparatus of claim 9 characterized in that said drive comprises a drive train connected to a power source and a clutch located in the drive train.

12. The trash removal apparatus of claim 11 characterized in that said drive train comprises pulleys and a belt interconnecting said pulleys, and said clutch comprises a jockey pulley to tension said belt, a remotely-operable thrust device connected to the jockey pulley and resilient means biassing the jockey pulley in the direction of decreasing belt tension.

13. A sugar cane harvester comprising trash removal apparatus according to claim 11 characterized in that said drive train is connected to and is drivable by an elevator conveyor for carrying harvested crop on the harvester.

* * * * *